Dec. 20, 1966   E. A. VOSIKA   3,292,782
APPARATUS FOR HANDLING MAGNETIC CORES
Filed Sept. 8, 1964   3 Sheets-Sheet 1

INVENTOR.
EUGENE A. VOSIKA
BY
Meyers & Peterson
ATTORNEYS

Dec. 20, 1966  E. A. VOSIKA  3,292,782
APPARATUS FOR HANDLING MAGNETIC CORES
Filed Sept. 8, 1964  3 Sheets-Sheet 2
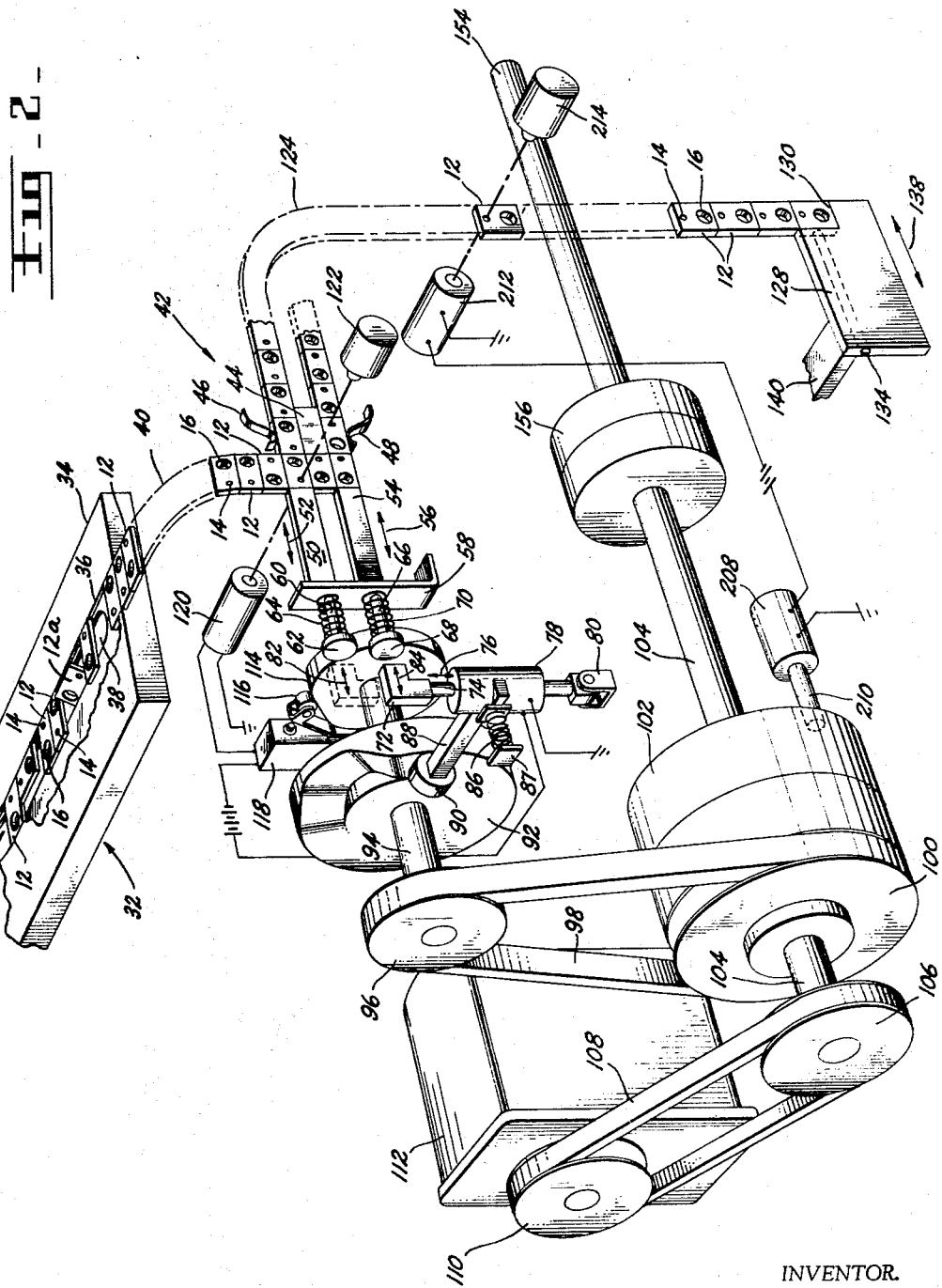
INVENTOR.
EUGENE A. VOSIKA
BY
Meyers & Peterson
ATTORNEYS

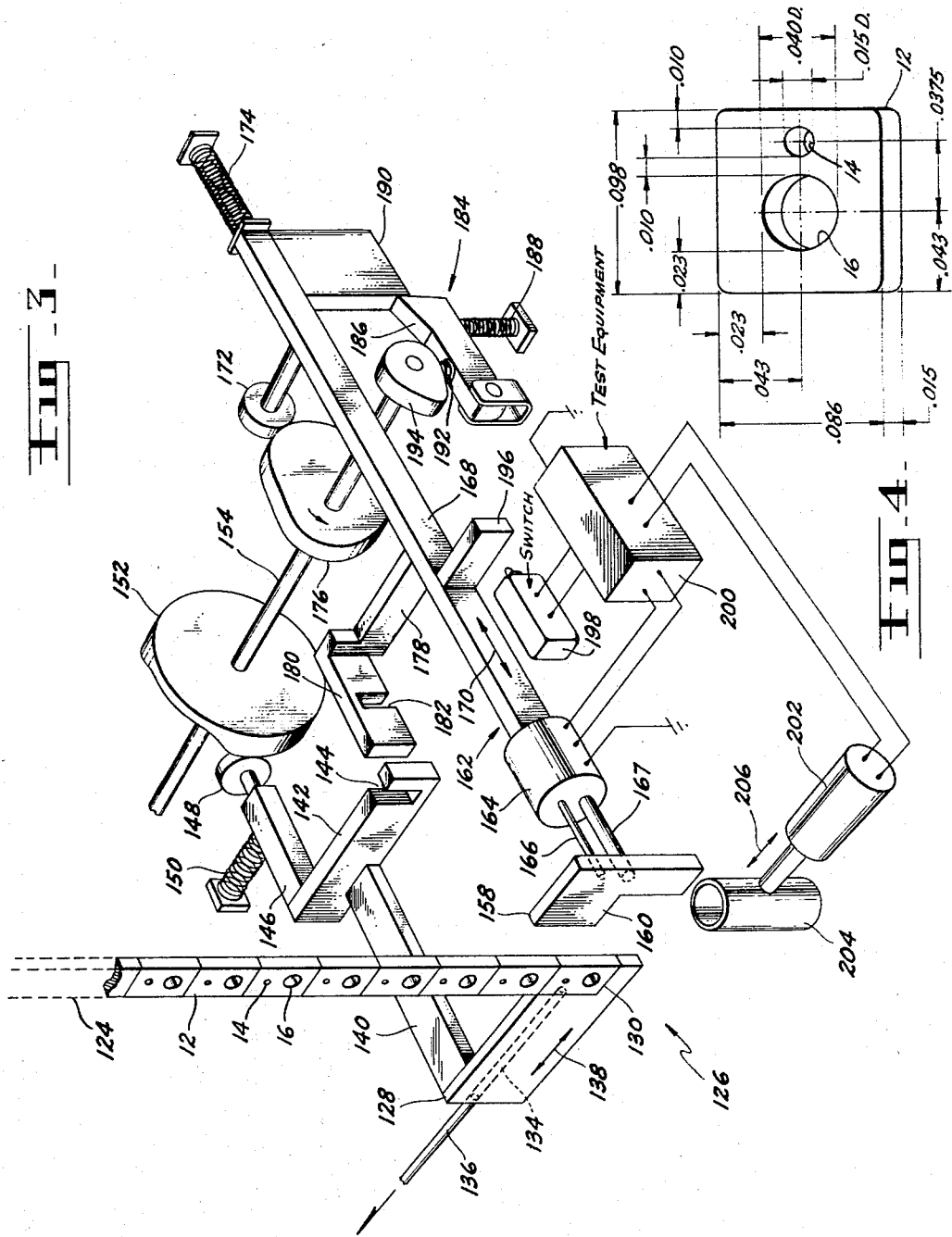

United States Patent Office 3,292,782
Patented Dec. 20, 1966

3,292,782
APPARATUS FOR HANDLING MAGNETIC CORES
Eugene A. Vosika, New Brighton, Minn., assignor to Ramsey Engineering Company, St. Paul, Minn., a corporation of Minnesota
Filed Sept. 8, 1964, Ser. No. 394,965
15 Claims. (Cl. 209—72)

This invention relates generally to apparatus for handling magnetic cores, and pertains more particularly to a device for orienting and testing rectangular cores.

Ferrite cores are utilized quite extensively in the memories of high-speed electronic computers. While many such cores are in the form of small torroids, more recent core innovations have resulted in use of rectangular core elements having one or more holes therein. Since the holes in any given core element differ from each other as to their diameters and also since the holes are not symmetric, it follows that special testing problems have arisen with respect to properly orienting such core elements.

One object of the present invention is to provide a core handler that will initially orient the rectangular cores in accordance with their relative hole locations, thereby providing a sequence of cores having their holes arranged uniformly.

Another object of the invention is to present the oriented core elements in a manner such that the proper entry of the test probe means will be assured, thereby minimizing or obviating any chance of damage to the probe means which are usually quite expensive items.

Still further, it is an object of the invention to provide a core handler that can be operated at a high speed, thereby resulting in the handling and testing of a relatively large number of cores during a given period.

While one of the foregoing objects of the invention is to prevent damage to the test probe means, yet another object of the invention is to prevent the likelihood of damage to the various parts comprising the handler itself. More specifically, the invention has for an aim the provision of certain resilient actuators which are allowed to function only if an orderly handling procedure is being followed by the core handling machine.

Still another object is to correlate sections of the core handler so that cores will not be delivered faster to a particular station, more specifically the testing station, than can be accommodated at that station, thereby avoiding any objectionable and improper "backing up" of the cores to the preceding station.

These and other objects and advantages of my invention will more fully appear from the following description, made in connection with the accompanying drawings, wherein like reference characters refer to the same or similar parts throughout the several views and in which:

FIGURE 2 is a perspective view, somewhat schematically portrayed, illustrating principally the parts of the machine concerned with the hole orientation of the cores;

FIGURE 3 is a perspective view, also rather schematically presented, of the parts of the machine concerned chiefly with the testing of the magnetic cores, and FIGURE 4 is a perspective view of an individual core element.

Figure 1:
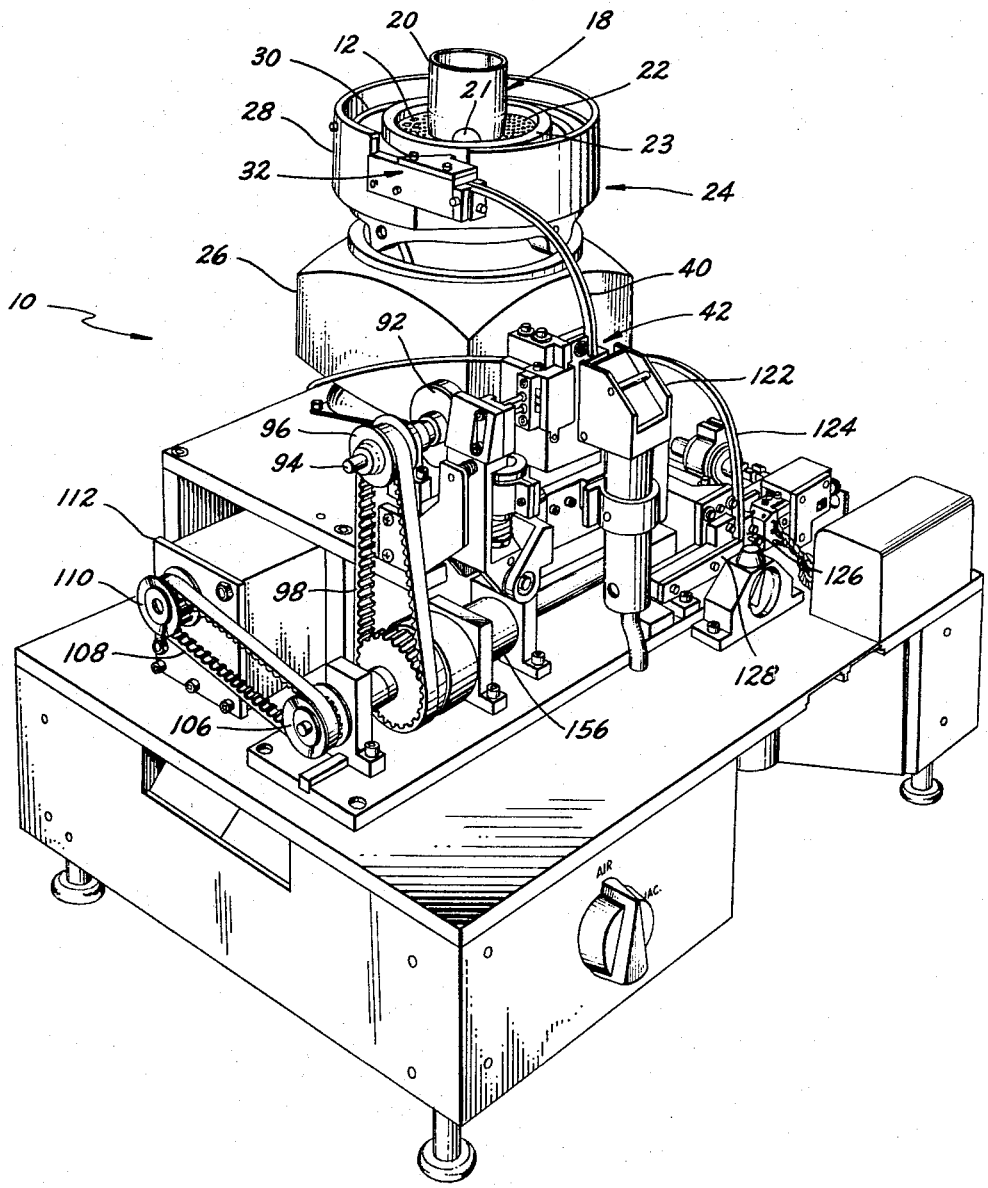
FIGURE 1 is a perspective view of a complete core handler exemplifying the invention.

As can be discerned from FIGURE 1, the core handler constructed in accordance with the teachings of the present invention has been designated in its entirety by the reference numeral 10. It will be helpful in appreciating the benefits to be derived from the invention to make immediate reference to the type of magnetic cores that are to be handled or processed. Therefore, attention is directed to the upper portion of FIGURE 2 where a series or sequence of core elements labelled 12 have been depicted and to the individual core element dimensionally pictured in FIGURE 4. The various core elements 12 are quite small dimensionally. It will be perceived that they possess a rectangular configuration and it can be stated that the customary length of such core elements is of the order of 0.098 inch and that the width thereof is approximately 0.086 inch. These core elements are also quite thin, being on the order of 0.015 inch. To give a further idea of the complexities present in the handling of such small core elements, it can be stated that the small hole 14 has a diameter approximating 0.010 inch. To further complicate matters, these holes 14, 16 do not have their hole centers symmetrically located with respect to the ends of the element, although these centers do happen to lie equally distant from the opposite sides of the element, as is clearly evident from FIGURE 4.

The first portion of the core handler 10 to be described is the screening and sizing assembly labelled 18. This assembly 18 includes a center feed tube or hopper 20 having semicircular openings 21 adjacent the bottom thereof which allow the randomly oriented core elements 12 to be gravitationally discharged onto a screen 22. The screen 22 sifts out a predominant number of broken pieces and also allows any foreign particles small enough to pass therethrough to escape downwardly. However, the screen 22 retains those elements 12 that are not broken. From FIGURE 1, it will also be observed that there is a cylindrical wall 23 extending about the periphery of the screen 22, this wall being elevated somewhat above the level of the screen 22 so as to retain those elements 12 on the screen 22 that have a thickness that is too great for proper processing. Although not visible in FIGURE 1, the cylindrical wall 23 is maintained in its slightly elevated condition with respect to the screen 22 by means of a number of angularly located spacers or short posts.

The screening and sizing assembly 18 is centrally located with respect to a vibratory conveyor mechanism denoted generally by the reference numeral 24. Such mechanisms 24 are readily available on the market, one such mechanism being sold under the name of "Syntron," which type of mechanism is fully described in Patent No. 2,696,292 issued to William V. Spurlin on December 7, 1954. The mechanism 24 includes a casing 26 in which is housed an electromagnetic motor for producing desired vibrations. Surmounting the casing 26 is a feed bowl 28 which receives the initially screened elements 12 that pass beneath the slightly elevated wall 23. A spiral track or raceway 30 extends upwardly from the floor of the feed bowl 28, and through the agency of the vibrations set up in the mechanism 24, the elements 12 travel upwardly along the track 30.

At the upper end of the track 30 is a width discriminator 32. Reference should be made to FIGURE 2 for the construction of the discriminator. From FIGURE 2, it will be observed that the discriminator 32 comprises a horizontal plate 34 having a longitudinal groove 36 formed therein with a slot 38 arranged lengthwise at the bottom of the groove 36. Those elements 12 entering the width discriminator 32 with their short axes arranged transversely across the slot 38 will simply fall through the slot and return to the feed bowl 28 for recirculation (see the element labelled 12a). However, those elements entering the width discriminator 32 with their long axes across the slot 38 will continue to the other end of the groove 36 from whence they entered.

Associated with the discharge end of the groove 36 is an orientation chute 40 curving downwardly to a hole discriminator or orientation station designated by the numeral 42. Although the elements entering the tube 40 are oriented with their long axes parallel to each other, it will be recognized that an additional orientation is necessary due to the ambiguity of the holes 14 and 16, for some of the elements will have their small holes in the same direction but others will have the small holes in an opposite direction. It is the function of the hole discriminator 42 to accept only those elements 12 with their holes arranged a certain way.

Describing in detail the parts comprising the hole discriminator 42, it will be seen that there is a divider plate 44 having a height equal to the width of a given core element 12. Actually, the divider plate 44 will be larger than shown in FIGURE 2, having two horizontal passages arrayed one above the other so that the acceptable cores can enter one passage and the rejected cores can enter the other. For drafting simplicity, these passages are not shown. However, an upper leaf spring 46 and a lower leaf spring 48 are depicted which, in effect, provide such passages, the core elements passing either above or below the divider plate 44 and between the spring 46 or the spring 48, as the case may be.

Further included in the hole discriminator 42 is an upper transfer blade 50 reciprocable in the direction of the arrow 52, and a lower transfer blade 54 also reciprocable in the same general direction which has been indicated in the latter situation by the arrow 56. A fixed bracket support 58 is shown which has a pair of apertures arranged one above the other for the slidable accommodation of a rod 60 having a head 62 thereon which is biased to the left by a spring 64 and a rod 66 in the other instance provided with a head 68 and a biasing spring 70. Consequently, both transfer blades 50, 54 are urged normally to the left as viewed in FIGURE 2.

At this time, attention is directed to an L-shaped interposer or drive bar 72. This bar 72 is mounted at the upper end of a rod 74 that is vertically reciprocable in the direction of the arrow 76. The rod 74 constitutes the armature of a solenoid 78 which is pivotally mounted at its lower end as indicated by the reference numeral 80.

As presently will be made manifest, the interposer bar 72 when in its upper or phantom line position will be oscillated in the direction of the arrow 82, whereas the interposer bar when in its lower or solid line position will be oscillated in the direction of the arrow 84. Thus, when in its raised position, the interposer bar 72 will be aligned with the head 62 and its oscillation will cause the upper transfer blade to eject the particular core element 12 in its path to the right so that it passes between the divider plate 44 and the upper leaf spring 46. On the other hand, when the interposer bar 72 is in its lower position, it acts against the head 68 so as to force the lower transfer blade 54 to the right, thereby causing the particular core element 12 in its path to be moved to the right between the divider plate 44 and the lower leaf spring 48. The leaf springs 46, 48, it might be mentioned, function as pressure pads so as to hold the particular elements 12 that have been shoved into engagement therewith in a fashion such that they will not be inadvertently returned to the position from which they came which could cause possible blockage or inaccurate operation of the hole discriminator 42.

The interposer bar 72 is actuated by a drive spring 86 which is compressed between the solenoid 78 and a fixed point 87. The drive spring 86 can move the interposer bar 72 against either the head 62 or the head 68, as the case may be, only if permitted to do so by a mechanism now to be referred to.

In the above regard, it will be noted that an arm 88 extends from the solenoid 78 and carries at its free end a cam follower 90. The follower 90 is urged into engagement with an appropriately configured face cam 92 which either allows the spring 86 to force the interposer bar 72 to the right or restrains such action.

The cam 92 is fixedly mounted on a rotatable shaft 94 having a pulley 96 at one end thereof. Entrained about the pulley 96 is a belt 98 which also extends about a pulley 100 which is directly associated with an orient clutch 102. Although not shown and although the reason therefor will not be entirely apparent at this time, the orient clutch 102 is biased away from the pulley 100. The means for effecting engagement of the clutch 102 with the pulley 100 will be described hereinafter, but it can be stated that for the major portion of the time, if everything is proceeding according to schedule, the clutch 102 will be engaged with the pulley 100. The clutch 102 is carried on a rotatable shaft 104 having a pulley 106 thereon, the pulley 106 having a belt 108 passing thereabout and also passing about a pulley 110 connected directly to a drive motor 112.

In addition to the cam 92, a second cam 114 is mounted for rotation with the shaft 94. The cam 114 has its periphery in engagement with a cam follower 116 which is directly associated with a cam switch 118 in circuit with the solenoid 78. Also included in the circuit is a photo diode 120 which receives light from a light source 122. The diode 120 and the light source 122 are located so that light can only pass through the small hole 14 of a given core element 12. If the small hole 14 is located so that light can pass through, then the particular core element is properly oriented as far as its holes 14, 16 are concerned. It will be recognized that elements 12 of either hole orientation fall into the chute 40 and form a column. However, only those elements 12 having a given hole orientation will be regarded as acceptable. We have rather arbitrarily chosen to locate the smaller hole 14 for detection purposes. Still further, this hole orientation occurs at a point on the center line of the third element 12 up from the bottom, as shown in FIGURE 2, the hole being at the left in the illustrated situation.

At any rate, it can be understood that when the small hole is properly oriented or aligned, it will be directly in the path of the light from the source 122. This permits a beam of light to pass through the particular hole 14 and thereby actuate the photo diode 120. Actuation of the diode 120 provides an electrically conductive path through the solenoid 78 which causes the solenoid to move its rod or armature 74 upwardly, thereby positioning the interposer bar 72 in the phantom position. This is the accept position. Consequently, when the face cam 42 has rotated into a proper angular position, the drive spring 86 urges the interposer bar 72 against the head 62, thereby driving the transfer blade 50 against the particular core element 12 that is in its path, this resulting in this core element being shoved or ejected to the right, that is, between the divider plate 44 and the upper leaf spring 46. It is retained in this position until the next succeeding properly oriented element is similarly shoved by the transfer blade 50. It will be understood that as soon as the transfer blade 50 has been retracted through the agency of the coil spring 64 that the next element 12 will fill the space occupied by the core element 12 that has just been pushed to the right, the descending stream of core elements 12 always assuring that a core element will be available.

If the next core element 12 that descends into juxtaposition with the transfer blade 50 is similarly oriented as was its predecessor, the predecessor being the one that has just been shoved to the right, then the same action will be repeated.

On the other hand, if the next core element 12 is improperly located, that is, it has its large hole 16 to the left, then the location of this hole is such as to not pass any light from the source 112. This causes the photo diode 120 to remain de-energized with the consequence that no circuit is completed to the solenoid 78. Owing to this happening, the interposer bar 72 will remain down, that is, in its solid line position and will be in alignment with the head 68. Thus, when the face cam 92 allows the interposer 72 to be urged to the right through the instrumentality of the spring 86, the transfer blade 54 is actuated rather than the transfer blade 50. This causes the lowermost core element 12 to be shoved to the right, the core element entering the space between the divider plate 44 and the leaf spring 48. Hereagain, as the transfer blade 54 is returned under the influence of the spring 70, the entire stack of elements 12 is allowed to drop one element width. The result is that the particular element 12, which has been previously positioned in the orientation detection area, is now disposed one element width below the orientation area. This element will subsequently be pushed into the reject space between the divider plate 44 and the leaf spring 48. Although not depicted, the elements passing between the divider plate 44 and the lower leaf spring 48 will be progressively shoved into a reject receptacle; they are only rejected, however, by virtue of their hole orientation and can readily be loaded back into the hopper 20 for reprocessing.

Those properly oriented core elements 12 which pass between the divider plate 44 and the spring 46 are caused to enter a transfer chute 124 leading to a test station designated generally by the reference numeral 126. The apparatus at the test station 126 includes a carrier 128 having an element-receiving notch 130 that is juxtaposed beneath the discharge end of the transfer chute 124 when the carrier 128 is retracted to its loading position. There is a passage 134 extending through the carrier 128 and as can be seen in FIGURE 3, the passage 134 is connected to a flexible hose or tube that leads to a vacuum source (not shown). Consequently, when a core element 12 drops from the chute 124 into the notch 130 of the carrier 128, it is held by vacuum until released in a manner hereinafter described.

The carrier 128 is reciprocable in the direction of the arrow 138. To effect such movement of the carrier 128, the carrier is mounted on an arm 140 that is in turn attached to what will be called a carrier match bar 142 having an upwardly directed slot 144 therein. The match bar 142 is mounted on an arm 146 which carries a cam follower 148. The cam follower 148 is actuated by a drive spring 150, the drive spring 150 being under compression, so as to cause the follower 148 to bear against a face cam 152. The cam 152 is mounted for rotation with a shaft 154 which is driven from the shaft 104 (FIGURE 2) through a test clutch 156.

The role played by the carrier 128 is to deliver the particular element 12 that has been deposited in its notch 130 to a match plate 158 having a notch 160 therein. It is when a core element 12 has been properly located in the notch 160 of the match plate 158 that it is ready for testing.

With regard to the apparatus employed for testing, what will be termed a probe assembly 162 includes a probe body 164 carrying a pair of conventional test probes 166, 167 projecting therefrom, each probe having the usual two needles or electrodes (not shown). The probe body 164 is mounted at one end of a support bar 168 which is reciprocal in the direction of the arrow 170. It will be observed that the bar 168 carries a cam follower 172 and that by reason of a drive spring 174, which is under compression, causes the follower 172 to engage a cam 176 on the previously-referred-to test shaft 154.

The probe assembly 162 further includes an arm 178 extending laterally from the bar 168. At the free end of the arm 178 is a probe match bar 180 having a downwardly directed slot 182. The slot 144 in the carrier match bar 142 is of a width to accommodate the width or thickness of the probe match bar 180, and by the same token the slot 182 is of a width to accommodate or receive the width of the match bar 142.

Therefore, due to the presence of the carrier match bar 142 and the coaction with the probe match bar 180, if an element 12 is not properly located in the carrier 128, the carrier 128 will be prevented from reaching a position where the probes 166, 167 would be intended to enter the holes 14, 16 in a given element 12, since misalignment of an element, in relation to the probes 166, 167, could readily cause their destruction and thus loss of expensive equipment. Unless the carrier 128 reaches its terminal position, the carrier match bar 142, which moves in unison with the carrier 128, will fail to reach a position which will allow the probe match bar 180 to pass through the slot 144 in the carrier match bar 142. Misalignment on the order of only 0.002 inch of the interlacing slots 144, 182, will cause the probe assembly 162 to be restrained.

The above sequence of events only partially protects the probes 166, 167 from damage since as the carrier 128 retracts and returns to its loading or neutral position, the probe assembly 162 could slip off and still damage the probes 166, 167. In other words, if the carrier match bar 142 is in obstructive relationship with the probe match bar 180, it will prevent the probe assembly 162 from moving forwardly, but as soon as the carrier 128, being that the match bar 142 moves in unison therewith, is retracted or returned to its loading position beneath the discharge end of the chute 124, the assembly 162 would then be allowed to move forwardly due to the action of the drive spring 174. This is to be avoided.

In avoiding the condition above alluded to, a latch mechanism 184 is employed. This latch mechanism includes a pivotal dog or pawl 186 which is biased upwardly by a coil spring 188. When allowed to move upwardly to a sufficient extent, it is in an obstructive or arresting relationship with a stop 190. There is a follower 192 on the pivotal dog or pawl 186 which bears against the periphery of an interposer cam 194 also mounted on the test shaft 154. The need for the latch mechanism 184 will be explained and it should be emphasized that it is important to have the protection afforded by this arrangement. It should be appreciated, though, that the carrier 128 moves forwardly or to the right before the probe assembly 162 starts to move forwardly. However, if the carrier 128 has moved all the way so that the element 12 carried thereby has been moved into the notch 160 of the match plate 158, then the slot 144 will be properly oriented for the accommodation of the probe match bar 180. On the other hand, if the carrier 128 has not moved into the right position for test purposes, then the slot 144 in the match bar 142 will not be in alignment with the probe match bar 180.

Considering further the improper functioning of the apparatus, the movement forwardly of the assembly 162 can only occur to a very small degree, actually a matter of a few thousands of an inch, that is, until the end of the match bar 180 abuts one side of the match bar 142. While this happening will keep the probes 166, 167 from becoming damaged at this particular moment, it will not prevent damage when the match bar 142 is retracted, which it will be when the carrier 128 is to be returned to its loading position beneath the chute 124. It is the function of the latch mechanism 184 to cause its pawl 186 to be urged upwardly by the coil spring 188 if this improper operation has occurred, the interposer cam 194 allowing the pawl 186 to move up into the path of the stop 190. Thus, when the carrier match bar 142 is withdrawn, the latch mechanism 184 restrains the assembly 162 so that it cannot move forwardly and thereby damage the probes 166, 167. If there has been a proper matching or interlacing of the slots 144, 182, then the probe match bar 180 can enter the slot 144 on the match bar 142. As soon as the match bar 180 has entered the slot 144, only about a $\frac{1}{16}$ inch travel being necessary, then the stop 190 has moved so that it overlies the end of the pawl 186. Consequently, further advancement of the assembly 162 under the influence of the spring 174 will ause the bottom of the stop 190 to merely ride along the pawl 186, there being no obstructive relationship. In other words, the probe assembly 162 can complete its stroke and the testing of the core element 12 can be effected.

To initiate the testing period, an arm 196 is mounted at one side of the bar 168. The arm 196 engages a switch 198 which energizes the test equipment 200. The test equipment evaluates the condition of the particular core element 12 through the agency of the probes 166, 167. If the core is magnetically acceptable, then the test equipment 200 energizes a solenoid 202 to cause an accept receptacle 204 to be moved beneath the core element 12 that is being tested, the arrow 206 indicating the reciprocal movement of the receptacle 204. Although not shown, a small flange at the rear of the notch 160 restrains the core element so that it is stripped from the probes 166, 167 as the probe 164 is retracted after the completion of a test. If the test is unsatisfactory, then the receptacle 204 is not moved into proper position for attaching the core element 12 as it is stripped from the prongs and the core element then falls into a reject hopper (not shown).

An additional feature of the invention resides in the control of the quantity of core elements 12 immediately above the test station 126. This automatic control prevents unnecessary jamming of the elements within the chute 124 against the transfer blade 50. In other words, if the entire chute 124 were to become filled with properly oriented elements 12, the accept transfer blade 50 would continue to insert or transfer properly oriented elements 12 into the chute 24. This backing up is obviously to be avoided.

Accordingly, as illustrated in FIGURE 2, a solenoid 208 having an armature or plunger 210 is utilized, the schematic operation of this solenoid when energized urging the plunger 210 against the orient clutch 102 so as to effect engagement thereof with the pulley 100. The solenoid 208 is in circuit with a photo diode 212 which receives light from a source 214 only when the chute 124 is filled to a height beneath the elevation at which the diode 212 and source 214 are located. The chute 124 can be of transparent material or there can be an appropriate set of holes therein in order to permit passage of light from the source 214 onto the diode 212. When the elements block the light path, however, then the solenoid 208 becomes deenergized and through spring action the clutch 102 becomes disengaged. Stated somewhat differently, there must be an absence of core elements 12 in the immediate vicinity of the diode 212 and the light source 214 in order to have additional core elements fed to the chute 124.

Since a detailed operational sequence has been presented as the description progressed, no need is seen for a specific operational description at this time. Therefore, for the sake of brevity, no separate and distinct operational sequence will be given.

It will, of course, be understood that various changes may be made in the form, details, arrangements and proportions of the parts without departing from the scope of my invention as set forth in the appended claims.

What is claimed is:
1. Handling apparatus for rectangular magnetic cores having a pair of holes nonsymmetrically located with respect to their ends comprising:
 (a) a test station having a probe means movable from a retracted position to an advanced position;
 (b) said probe means including a pair of probes having a spacing so as to be insertable in said core holes when a core is properly oriented;
 (c) means for causing progression of those rectangular cores having their longitudinal axes arranged generally parallel to each other in a predetermined manner and for diverting the remainder of said cores;
 (d) means for causing further progression of those cores having their axes arranged in said predetermined manner so that their holes are all arranged in the same direction and for diverting those having their holes oppositely arranged, and
 (e) means for transferring the cores which have their holes arranged in said same direction from said last-mentioned means to said test station so that each core is properly oriented with respect to said probes.

2. Handling apparatus in accordance with claim 1 in which:
 (a) said first-mentioned progression-causing means includes a slot having a width less than the length of the cores to be tested,
 (b) whereby said remainder cores fall gravitationally therethrough.

3. Handling apparatus in accordance with claim 1 in which said second-mentioned progression-causing means includes:
 (a) a photo detector mounted so as to receive light through a particular one of said holes, and
 (b) a member controlled by said detector for engaging a core when arranged in said same direction to cause said further progression.

4. Handling apparatus for rectangular magnetic cores having a plurality of holes therein with one hole being nearer one end comprising:
 (a) means for storing said cores in a randomly oriented condition;
 (b) a width discriminator;
 (c) means for transferring said randomly oriented cores from said storage means to said width discriminator in a single file relation,
 (d) whereby those cores having their length extending transversely to their direction of travel are separated from the others;
 (e) hole orientation means for receiving the separated cores from said width discriminator and separating therefrom those cores having their holes arranged in a certain direction,
 (f) testing means including a probe body having a plurality of probes, and
 (g) means for delivering the separated cores from said hole orientation means to said testing means in a properly oriented position for testing purposes.

5. Handling apparatus for rectangular magnetic cores having a pair of holes, each hole being located differently with respect to its adjacent end of the core than the other, the apparatus comprising:
 (a) photoelectric means;
 (b) means for feeding the cores in an end-to-end stream past said photoelectric means,
 (c) said photoelectric means being disposed so as to be energized by light passing through a certain one of said holes and not the other;
 (d) means controlled by said photoelectric means for removing those cores having a desired hole orientation from said stream, and
 (e) a test station including a reciprocable probe body having a pair of probes arranged in accordance with said desired hole orientation, and
 (f) means for successively presenting said cores having said desired hole orientation to said test station for insertion of said probes into each core.

6. Handling apparatus in accordance with claim 5 in which:
 (a) said core presenting means includes a carrier member reciprocable in a direction generally perpendicular to said probe body.

7. Handling apparatus in accordance with claim 6 including:
 (a) means associated with said probe body and carrier member for preventing advancement of said probes if a core is not properly positioned on said carrier member.

8. Handling apparatus in accordance with claim 7 in which said preventing means includes:
   (a) a first notched match bar movable with said probe body, and
   (b) a second notched match bar movable with said carrier member,
   (c) the notches of said bars interfitting if the core positioned on said carrier member is properly positioned for testing.

9. Handling apparatus in accordance with claim 8 including:
   (a) cam means for causing reciprocable movement of said carrier bar,
   (b) said preventing means additionally including a latch mechanism for restraining said probe body and a cam means operated in timed relation with said first cam means for actuating said latch mechanism into a release position only when said carrier member has moved the core carried thereon to its test position.

10. Handling apparatus for rectangular cores having a pair of holes, each hole being located differently with respect to its adjacent end of the core than the other, the apparatus comprising:
    (a) photoelectric means disposed so as to be energized only when a certain one of said holes is in alignment therewith;
    (b) means for feeding the cores in sequence past said photoelectric means so as to cause energization of said photoelectric means if said certain hole is properly oriented;
    (c) means for forcing the properly oriented cores to one side;
    (d) means conditioned by said photoelectric means for allowing actuation of said forcing means;
    (e) cam means for causing said forcing means to function if said last-mentioned means has been conditioned by said photoelectric means, and
    (f) means for testing those cores forced to one side by said forcing means.

11. Handling apparatus for rectangular cores having a pair of holes spaced differently with respect to the ends of the core, the apparatus comprising:
    (a) means for feeding a series of cores in column form;
    (b) means for detecting whether the holes of said cores are oriented in a given direction;
    (c) an actuating member for pushing each core having its holes oriented in said given direction to one side;
    (d) spring means for biasing said actuating member in the direction of said cores;
    (e) rotatable cam means for overcoming the action of said spring means when in one rotative position to retract said actuating member and to allow said spring means to cause said actuating member to push a core when in a second rotative position;
    (f) a test station;
    (g) a reciprocable carrier member for receiving cores pushed to one side by said actuating member for delivering to said test station;
    (h) spring means for biasing said carrier member toward said test station, and
    (i) rotatable cam means for overcoming the action of said last-mentioned spring means when in one rotative position to retract said carrier member and to allow said last-mentioned spring means to cause said carrier member to advance toward said test station when in a second rotative position.

12. Handling apparatus in accordance with claim 11, in which said test station includes:
    (a) a reciprocable probe body having a pair of probes insertable in said core holes;
    (b) spring means for biasing said probe body into a hole-inserting position, and
    (c) rotatable cam means for overcoming the probe biasing means when in one rotative position to retract said probe body and to allow said probe biasing means to cause said probe body to advance toward its said hole-inserting position.

13. Handling apparatus for rectangular magnetic cores having a pair of holes nonsymmetrically located with respect to their ends, one of said holes in each core being of larger cross section than the other, comprising:
    (a) a test station having a probe means movable from a retracted position to an advanced position;
    (b) said probe means including a pair of probes, one of which is of larger cross section than the other, having a spacing so as to be insertable in said core holes when a core is properly oriented;
    (c) means for causing progression of those rectangular cores having their longitudinal axes arranged generally parallel to each other in a predetermined manner and for diverting the remainder of said cores;
    (d) means for causing further progression of those cores having their axes arranged in said predetermined manner so that their holes are all arranged in the same direction and for diverting those having their holes oppositely arranged, and
    (e) means for transferring the cores from said last-mentioned means which have their holes arranged in said same direction to said test station so that each core is properly oriented with respect to said probes.

14. Handling apparatus for rectangular cores having a pair of holes spaced differently with respect to the ends of the core, the apparatus comprising:
    (a) a width discriminator including a plate provided with a longitudinal groove therein of a width approximating the length of the cores to be tested, said groove having a longitudinal slot therein of lesser width than the width of the groove;
    (b) means for passing a series of cores along said groove whereby those cores having their length extending transversely will continue across said plate and those having their width extending transversely will fall through said slot;
    (c) a hole discriminator for receiving cores that have continued across said plate including a photo detector energized through one of said holes and means for diverting each core that has caused energization of said detector, said diverting means including a cam actuated interposer bar and a solenoid for positioning said interposer bar in alignment with the particular core to be diverted, and
    (d) means for testing the diverted cores.

15. Handling apparatus for elongated magnetic cores each having an aperture nonsymmetrically located with respect to its ends comprising:
    (a) a test station having a probe means movable from a retracted position to an advanced position;
    (b) means for guiding and orienting at least some of said cores into single file with their longer axes parallel;
    (c) means for selecting from said oriented cores only those having their respective apertures located at corresponding predetermined positions, and
    (d) means for transferring the selected cores to said test station, said transferring means including means for presenting said cores to said test station so that their apertures are each in proper position to be penetrated by said probe means.

References Cited by the Examiner
UNITED STATES PATENTS

| | | | |
|---|---|---|---|
| 2,964,182 | 12/1960 | Spurlin | 209—75 X |
| 2,975,894 | 3/1961 | Hill | 209—72 |
| 3,091,332 | 5/1963 | Parker | 209—75 |

M. HENSON WOOD, Jr., *Primary Examiner.*

R. A. SCHACHER, *Assistant Examiner.*